US008761510B2

(12) United States Patent
Russakovsky et al.

(10) Patent No.: US 8,761,510 B2
(45) Date of Patent: Jun. 24, 2014

(54) OBJECT-CENTRIC SPATIAL POOLING FOR IMAGE CLASSIFICATION

(71) Applicant: NEC Laboratories America, Inc., Princeton, NJ (US)

(72) Inventors: Olga Russakovsky, Palo Alto, CA (US); Yuanqing Lin, Sunnyvale, CA (US); Kai Yu, San Jose, CA (US); Fei-Fei Li, Stanford, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 90 days.

(21) Appl. No.: 13/676,494

(22) Filed: Nov. 14, 2012

(65) Prior Publication Data

US 2013/0129199 A1 May 23, 2013

Related U.S. Application Data

(60) Provisional application No. 61/561,846, filed on Nov. 19, 2011.

(51) Int. Cl.
*G06K 9/00* (2006.01)
*G06K 9/62* (2006.01)
*G06K 9/46* (2006.01)

(52) U.S. Cl.
CPC ... *G06K 9/62* (2013.01); *G06K 9/46* (2013.01)
USPC .......................................... 382/173

(58) Field of Classification Search
CPC .......... G06K 9/00221; G06K 9/00228; G06K 9/00275; G06K 9/00302; G06K 9/00308; G06K 9/00315; G06K 9/00335; G06K 9/46; G06K 9/62; G06K 9/38; H04N 5/2226; G06T 7/0081; G06T 2207/20144
USPC ......... 382/115, 117, 118, 124, 125, 159, 173, 382/176, 181, 224, 225, 228
See application file for complete search history.

(56) References Cited

U.S. PATENT DOCUMENTS

| 7,110,569 | B2 * | 9/2006 | Brodsky et al. | 382/103 |
| 2006/0061598 | A1 * | 3/2006 | Mino et al. | 345/629 |
| 2008/0285859 | A1 * | 11/2008 | Lei et al. | 382/224 |
| 2009/0110236 | A1 * | 4/2009 | Huang et al. | 382/103 |

OTHER PUBLICATIONS

Van De Sande et al., "Segmentation as Selective Search for Object Recognition", ICCV 2011, Nov. 2011. (8 pages).

* cited by examiner

*Primary Examiner* — Brian Le
(74) *Attorney, Agent, or Firm* — Joseph Kolodka

(57) ABSTRACT

A method is provided for classifying an image. The method includes inferring location information of an object of interest in an input representation of the image. The method further includes determining foreground object features and background object features from the input representation of the image. The method additionally includes pooling the foreground object features separately from the background object features using the location information to form a new representation of the image. The new representation is different than the input representation of the image. The method also includes classifying the image based on the new representation of the image.

11 Claims, 9 Drawing Sheets

OBJECT-CENTRIC SPATIAL POOLING FOR IMAGE CLASSIFICATION

RELATED APPLICATION INFORMATION

This application claims priority to provisional application Ser. No. 61/561,846 filed on Nov. 19, 2011, incorporated herein by reference.

BACKGROUND

1. Technical Field

The present invention relates to image classification, and more particularly to object-centric spatial pooling for image classification.

2. Description of the Related Art

Image object recognition has been a major research direction in computer vision. Its goal is two-fold: deciding what objects are in an image (classification) and where these objects are in the image (localization). However, in practice, classification and localization are often treated separately. Object localization is generally deemed as a harder problem than image classification even when precise object location annotations are available during training. In the purely image classification setting, it may be seen as a detour to attempt to localize objects. As a result, current state-of-the-art image classification systems do not go through the trouble of inferring object location information.

Classification systems can be based on spatial pyramid matching (SPM), which pools low-level image features over pre-defined coarse spatial bins. However, there is room for improvement in the current implementations of pooling with SPM regarding the accuracy of the resultant classification.

FIG. 1 shows an example 100 of spatial pyramid matching (SPM) based pooling for image classification, in accordance with the prior art. For the sake of illustration, circles denote object-related local features, triangles denote background-related local features, and the numbers indicate the fraction of the respective local features in each pooling region. In the example 100, we show a first image 110 and a second image 120, both having a car as the object of interest. SPM based pooling results in inconsistent image features (as indicated by the fractions 111 and 121 corresponding to the first image 110 and the second image 120) when the object of interest (i.e., the car) appears in different locations within images, making it more difficult to learn an appearance model of the object.

SUMMARY

These and other drawbacks and disadvantages of the prior art are addressed by the present principles, which are directed to object-centric spatial pooling for image classification.

According to an aspect of the present principles, a method for classifying an image is provided. The method includes inferring location information of an object of interest in an input representation of the image. The method further includes determining foreground object features and background object features from the input representation of the image. The method additionally includes pooling the foreground object features separately from the background object features using the location information to form a new representation of the image. The new representation is different than the input representation of the image. The method also includes classifying the image based on the new representation of the image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to object-centric spatial pooling (OCP) for image classification. In an embodiment of the present principles, OCP can be considered to at least include the following two steps: (1) inferring the location of the objects; and (2) using the location information to pool foreground and background features separately to form the image-level representation. Step (1) is particularly challenging in a typical classification setting where precise object location annotations are not available during training. To address this challenge, in an embodiment, we propose a framework that learns object detectors using only image-level class labels, or so-called weak labels. Our learned detectors are comparable in accuracy with state-of-the-art weakly supervised detection methods. More importantly, the resulting OCP approach significantly outperforms SPM-based pooling in image classification.

Figure 1:
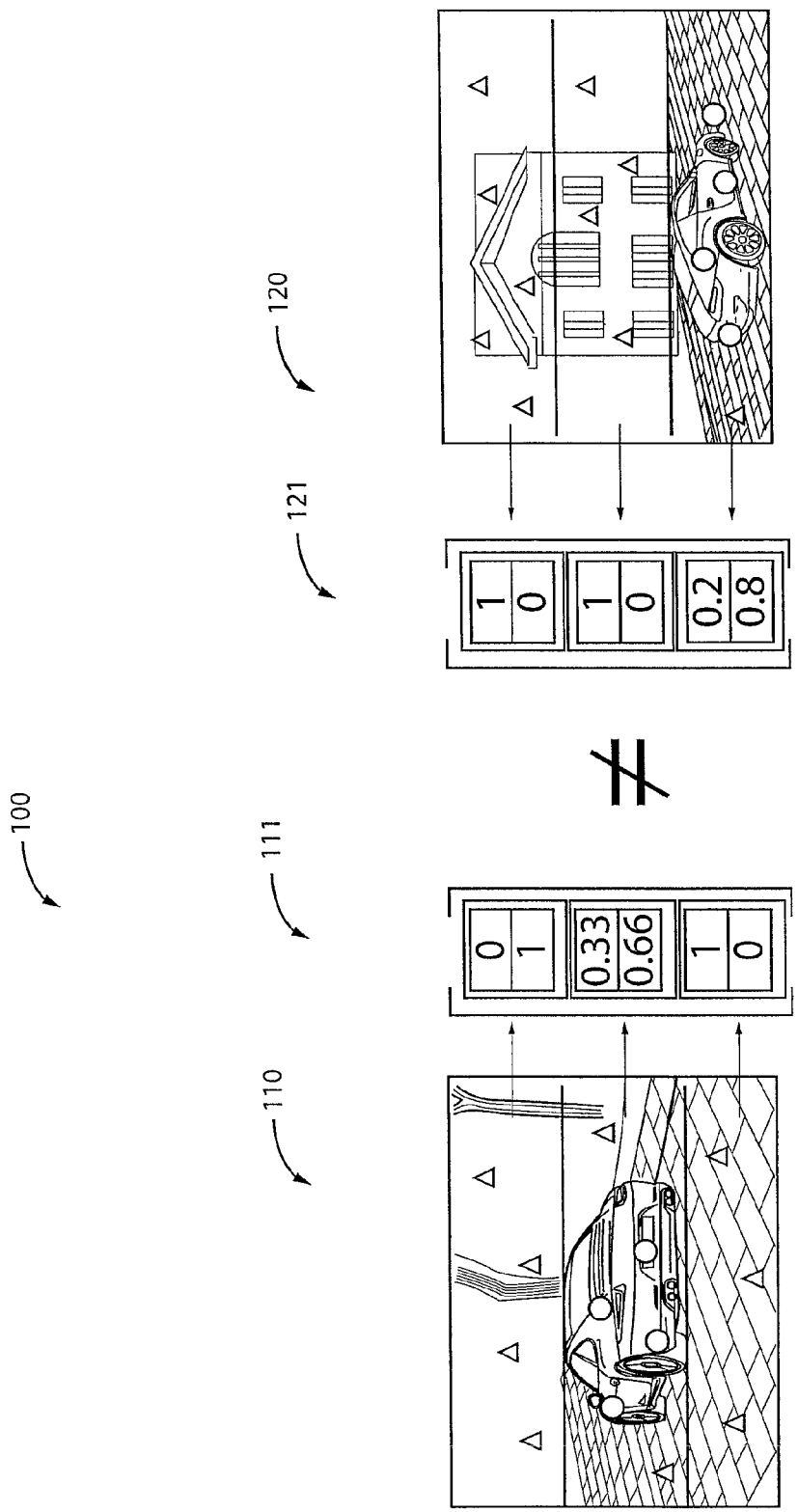
FIG. 1 is a diagram showing an example of spatial pyramid matching (SPM) based pooling 100 for image classification, in accordance with the prior art.
Figure 2:
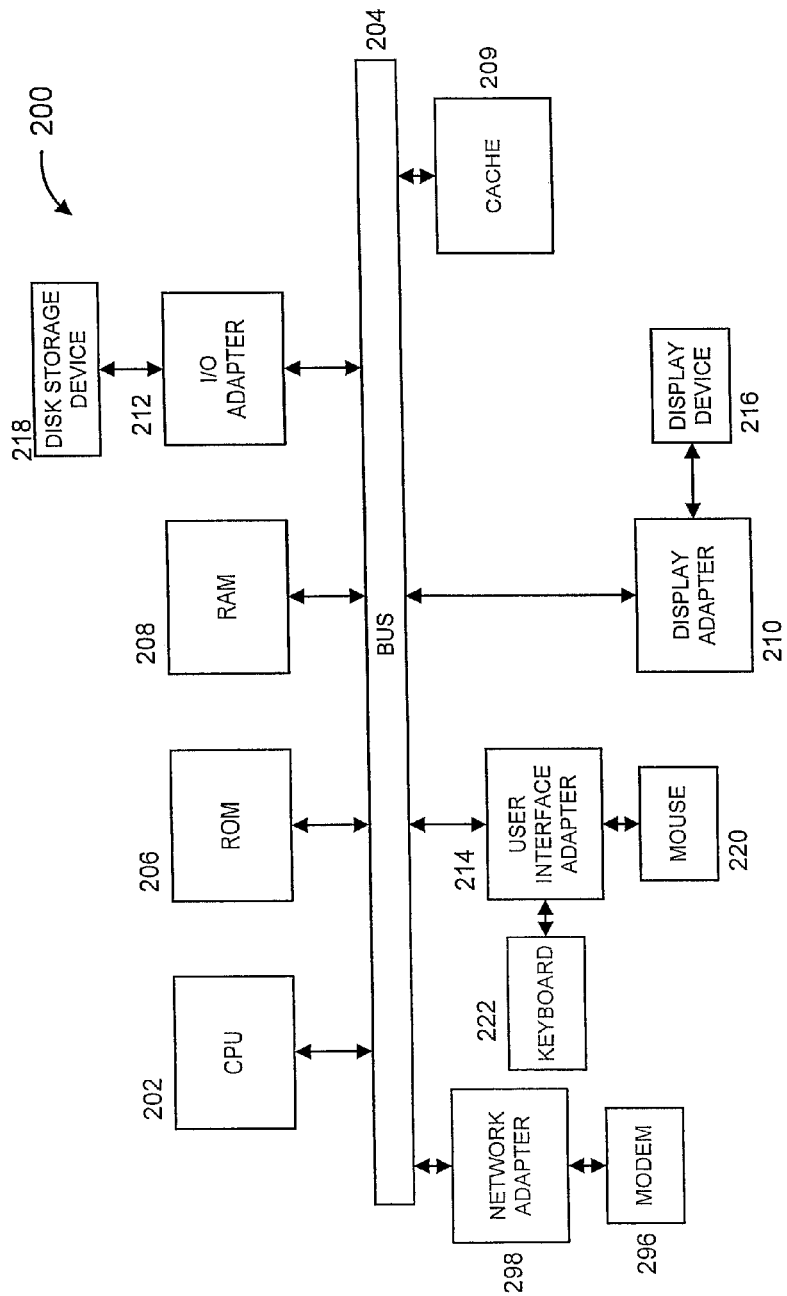
FIG. 2 is a block diagram illustrating an exemplary processing system 200 to which the present principles may be applied, in accordance with an embodiment of the present principles.

Referring now in detail to the figures in which like numerals represent the same or similar elements and initially to FIG. 2, a block diagram illustrating an exemplary processing system 200 to which the present principles may be applied, in accordance with an embodiment of the present principles, is shown. The processing system 200 includes at least one processor (CPU) 202 operatively coupled to other components via a system bus 204. A read only memory (ROM) 206, a random access memory (RAM) 208, a display adapter 210, an I/O adapter 212, a user interface adapter 214, and a network adapter 298, are operatively coupled to the system bus 204.

A display device 216 is operatively coupled to system bus 204 by display adapter 210. A disk storage device (e.g., a magnetic or optical disk storage device) 218 is operatively coupled to system bus 204 by I/O adapter 212.

A mouse 220 and keyboard 222 are operatively coupled to system bus 204 by user interface adapter 214. The mouse 220 and keyboard 222 are used to input and output information to and from system 200.

A (digital and/or analog) modem 296 is operatively coupled to system bus 204 by network adapter 298.

Of course, the processing system 200 may also include other elements (not shown), as well as may omit some elements, depending upon the application, as readily contemplated by one of skill in the art.

Figure 3:
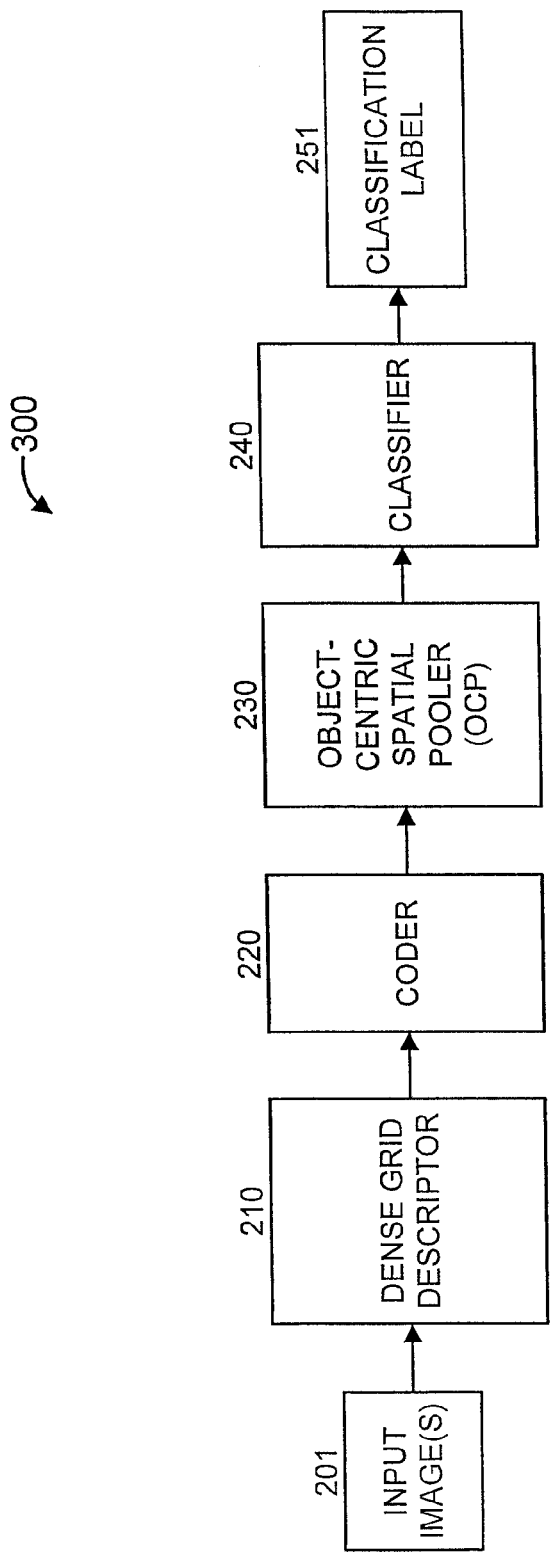
FIG. 3 is a block diagram showing an image classification system 300 with object-centric spatial pooling (OCP), in accordance with an embodiment of the present principles.

FIG. 3 shows an image classification system 300 with object-centric spatial pooling (OCP), in accordance with an embodiment of the present principles.

The system 300 includes a dense grid descriptor 310, a coder 320, an object-centric spatial pooler 330, and a classifier 340.

The dense grid descriptor 310 receives an input representation of an image 301 and samples there from low-level descriptors (hereinafter also interchangeably referred to as "features") such as, for example, dense histogram of oriented gradients (DHOGs) or local binary patterns (LBPs) on a dense grid. Of course, the present principles are not limited solely to the preceding features and, thus, other features can also be used while maintaining the spirit of the present principles.

The coder 320 codes the features into higher dimensions through vector quantization, local coordinate coding (LCC) and/or sparse coding to provide coded feature vectors. Of course, the present principles are not limited solely to the preceding types of coding and, thus, other types of coding can also be used while maintaining the spirit of the present principles.

The object-centric spatial pooler 330 pools the coded feature vectors to form an image-level feature representation that represents the image during classification. Advantageously and in accordance with the present principles, we focus and improve on spatial pyramid matching (SPM) pooling using our object-centric spatial pooling (OCP). The object-centric spatial pooler 330 performs object-centric pooling, localizes the object of interest, and then separately pools the foreground features from the background features to form a new representation of the image. The new representation of the image is different than the input representation of the image.

The classifier 340 performs image classification based on the new representation of the image provided by OCP. This resultant image classification 351 is more accurate than prior art approaches based on SPM, as described in further detail herein below. In an embodiment, the classifier 340 is a linear support vector machine (SVM). However, it is to be appreciated that the present principles are not limited solely to the use of a support vector machine to perform classification and, thus, other types of classifiers can also be used while maintaining the spirit of the present principles. Nonetheless, for the sake of illustration, the classifier 340 is interchangeably referred to herein as a support vector machine.

Regarding the prior art, the same use localization information learned in a weakly supervised way to help boost classification accuracy by focusing on pooling low-level object features without background features. However, most of them only validate their approach on less cluttered and mostly centered datasets such as subsets of Caltech101 categories, Oxford Flowers 17 dataset, and so forth. For example, one recently proposed prior art geometric pooling approach resizes each image to the same size and learns a class-specific weighting factor for each grid position in an image. On the Caltech101 dataset, where most images are roughly aligned and centered, this prior art approach somewhat improves over the previous state-of-the-art. However, it has difficulty handling cluttered images like the ones of the PASCAL07 classification dataset. Further, another prior art approach explicitly mentions that some degree of context information (like a road for cars) needs to be included into the detected object bounding box in order to be useful for image classification. However, this disadvantageously leads to very rough object localization even on simple datasets.

In contrast, the present principles deal with high intra-class variability in object location and our proposed object-centric spatial pooling approach yields both classification improvements as well as competitive object localization results on the challenging PASCAL07 classification dataset and, of course, any other datasets.

Further regarding the prior art, we note that if object location information is available during training, some prior art methods have been used to detect the object of interest, and have increased the output of object detectors to boost classification performance. However, there are at least two significant differences with these prior art approaches compared to the present principles. First, we focus on the purely classification setting where no annotations beyond image-level class labels are available during training. Second, we learn a joint model for both localization and classification instead of combining the scores of the two tasks as post-processing. We note that an aim of the present principles is image classification (not object localization), although object localization is utilized as an intermediate step to enhance the resultant image classification over the prior art.

Figure 4:
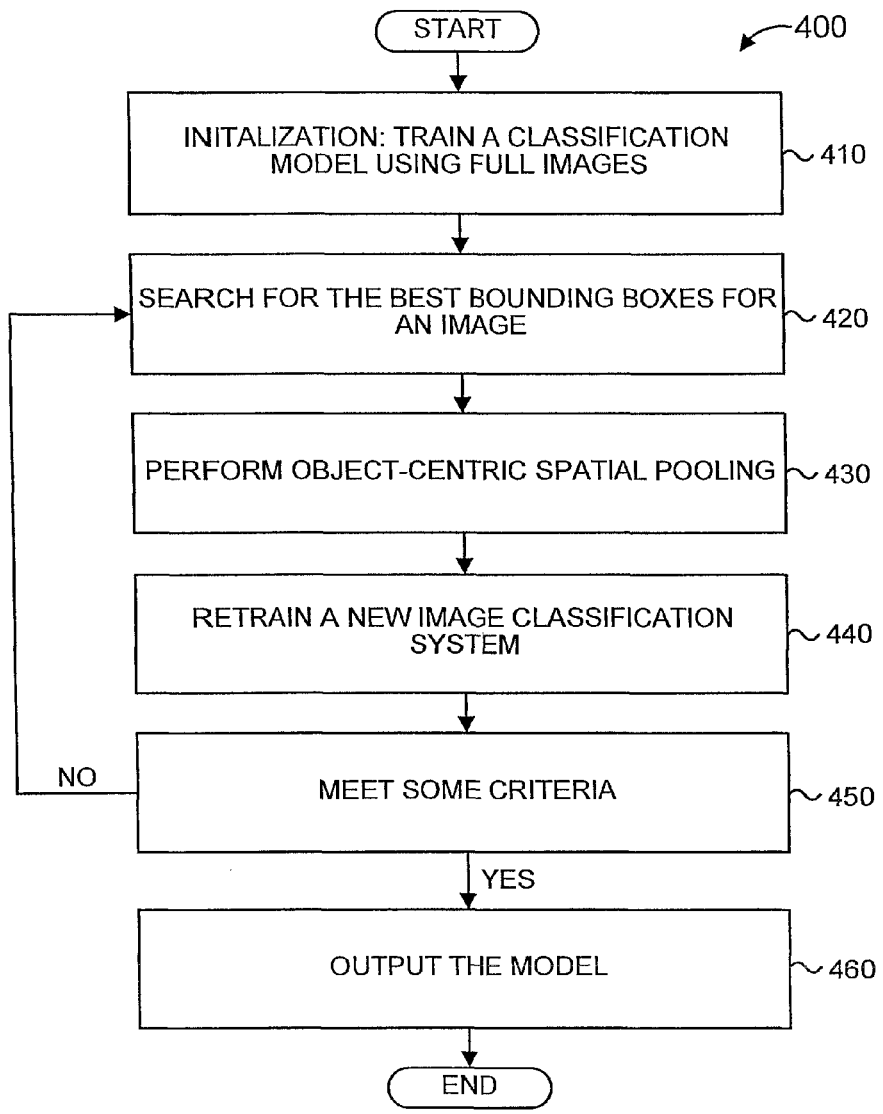
FIG. 4 is a flow diagram showing an exemplary method 400 for image classification with object-centric spatial pooling (OCP), in accordance with an embodiment of the present principles.

FIG. 4 is a flow diagram showing an exemplary method 400 for image classification with object-centric spatial pooling (OCP), in accordance with an embodiment of the present principles. At step 410, an initialization step is performed involving training a classification model using full images. At step 420, a search is performed for the best bounding boxes for an image. Certain criteria can be pre-specified for step 420 to determine the best bounding boxes from among many bounding boxes. Of course, it is appreciated that step 420 can involve simply finding the best bounding box. In an embodiment, the best bounding box is chosen as the bounding box having the highest score according to the current object model that we have trained. Thus, in an embodiment, the determination of the best bounding box or the best bounding boxes is based on having the highest score(s). Of course, step 420 is not limited to solely the preceding criteria and, thus, other criteria can also be used while maintaining the spirit of the present principles. At step 430, object centric spatial pooling (OCP) is performed to form a new image representation (for the image referred to in step 420). Step 430 is described in further detail in a least the FIG. 5 hereinafter. At step 440 a new image classification system is retrained using the results (the new image representation) of OCP. At step 450, it is determined whether or not the new image classification system meets some predefined criteria. If so, then the method 400 proceeds to step 460. Otherwise, the method 400 returns to step 420. Regarding the aforementioned predefined criteria referred to with respect to step 450, the same can involve the following. That is, step 450 is performed such that the process converges when the bounding boxes do not change from iteration to iteration. Such measurement of change can involve obtaining the same score or scores regarding step 420 or using a threshold amount of change, depending upon the implementation. Thus, in an embodiment, when the best bounding box that is found in the training images in step 420 is the same as in a previous iteration, the process is considered to have converged. Of course, it is to be further appreciated that in an embodiment, this training process can also terminated when the performance on a holdout set reaches a certain threshold and/or has exceeded an allotted training time.

Referring ahead to the method 800 of FIG. 8, we further note that the criteria relating to step 450 of FIG. 4 can be different criteria than that mentioned with respect to the FIG. 8, depending on the use of inner and outer loops described herein after regarding FIG. 8. However, it is to be appreciated that one or more of the same criteria can also be used, depending upon the implementation, as readily appreciated by one of ordinary skill in the art.

Figure 5:
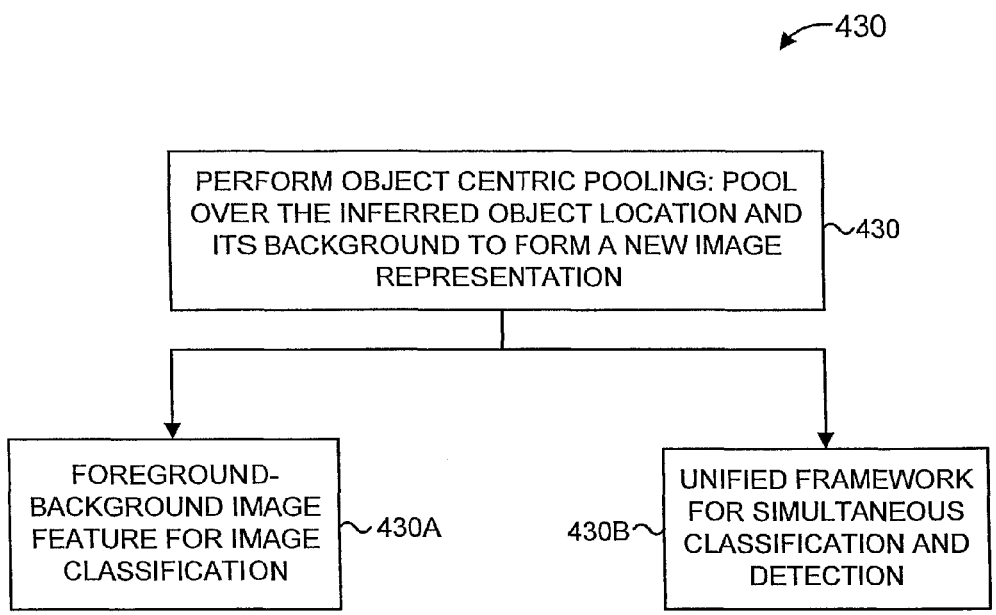
FIG. 5 is a flow diagram further showing the object-centric spatial pooling (OCP) step 430 of FIG. 4, in accordance with an embodiment of the present principles.

FIG. 5 is a flow diagram further showing the object-centric spatial pooling (OCP) step 430 of FIG. 4, in accordance with an embodiment of the present principles. At step 430, pooling is performed over the inferred object locations and the background of the inferred object to form a new image representation. It is to be appreciated that step 430 provides foreground and background images features for image classification 430A and a unified framework for simultaneous classification and detection 430B.

Figure 6:
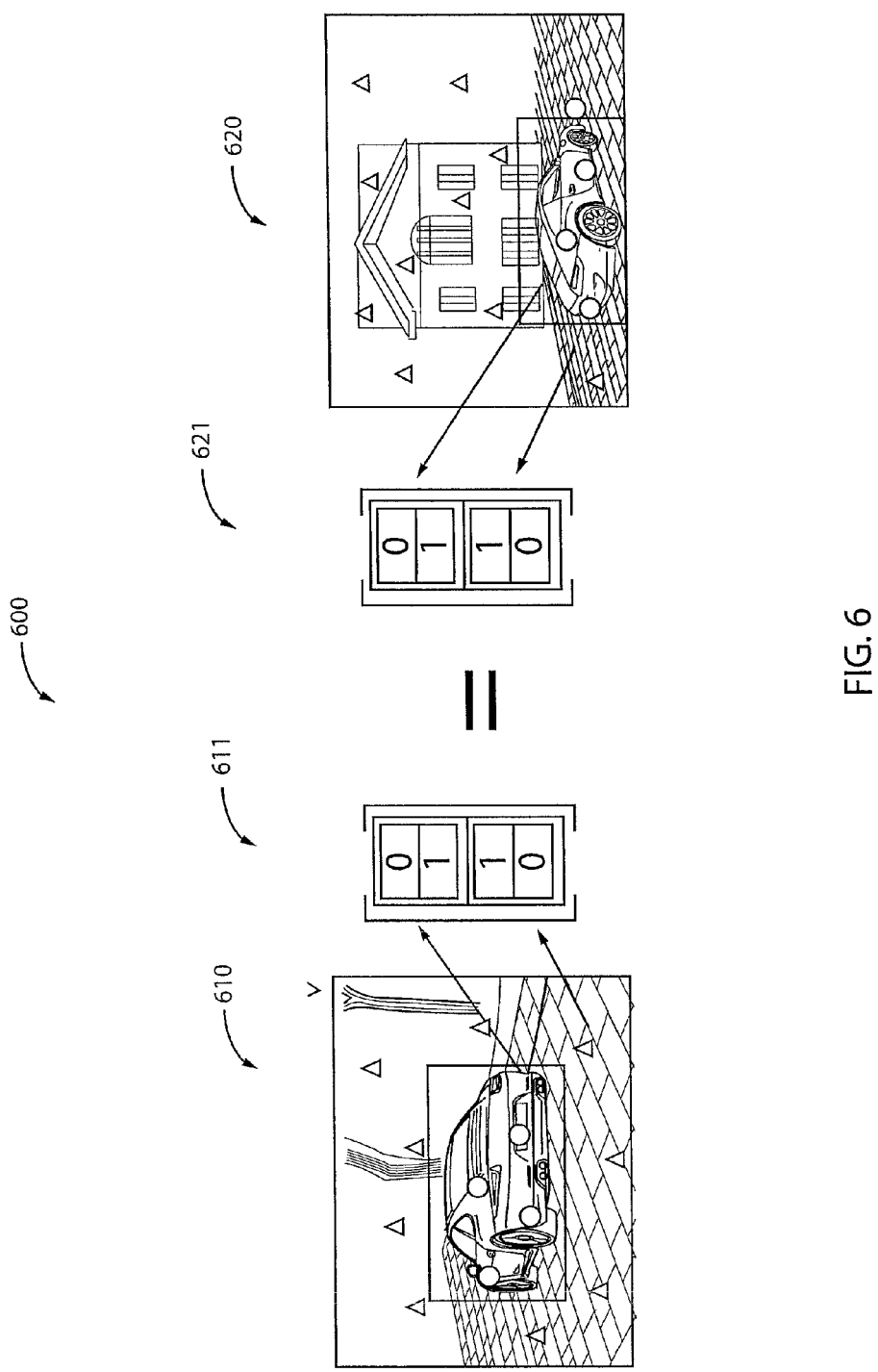
FIG. 6 is a diagram showing an example 600 of object-centric spatial pooling (OCP), in accordance with an embodiment of the present principles.

FIG. 6 shows an example 600 of object-centric spatial pooling (OCP), in accordance with an embodiment of the present principles. For the sake of illustration, circles denote object-related local features, triangles denote background-related local features, and the numbers indicate the fraction of the respective local features in each pooling region. OCP is a method which first localizes the object of interest and then pools foreground object features separately from background features. In the example 600, we show a first image 610 and a second image 620, both having a car as the object of interest.

Hence, in contrast to SPM pooling, OCP first infers the location of the object of interest and then pools low level features separately in the foreground and background to form the image-level representation. As shown in FIG. 6, if the location of the object of interest (i.e., the car in this example) is available, OCP produces more consistent feature vectors (as indicated by the fractions 611 and 621 corresponding to the first image 610 and the second image 620) than SPM pooling. Therefore, object location information can be very useful for further pushing the state-of-the-art performance of image classification.

Of course, the challenge for OCP is deriving accurate enough location information for improving classification performance. If the derived location information is not sufficiently accurate, it can end up hurting classification accuracy. There is prior art on learning object detectors using only image-level class labels (or weak labels). Although these methods yield acceptable localization results, they are formulated as detection tasks and have not been shown to be helpful for improving image classification performance. Some methods attempt to localize objects to improve image classification accuracy but only demonstrate results on simple datasets such as subsets of Caltech101 classes. In contrast, we evaluate our proposed OCP method on the highly cluttered PASCAL07 classification dataset, where we are able to localize objects with accuracy comparable to state-of-the-art weakly supervised object localization methods as well as to significantly improve image classification performance. OCP is the first approach to use weakly supervised object detection to improve image classification on the PASCAL07 classification dataset, which is considered a challenging object detection dataset even when bounding box annotations are provided for training.

We will now further describe object-centric spatial pooling (OCP) for image classification, in accordance with the present principles.

Let us first use an empirical experiment to quantitatively see how object location information can dramatically improve image classification performance. On the PASCAL07 classification dataset, we trained two classifiers for each object class: one classifier using features extracted from the full image; and the other classifier using features extracted only from the provided tight bounding boxes around the objects. We extracted image features and trained linear classifiers. Both classifiers were trained on the training set and tested on the validation set. The former classifier (trained on full images) yielded 52.0% mean average precision (mAP), whereas the latter classifier (trained and tested on tight bounding boxes) achieved an astonishing 69.7% mAP. In contrast, the current state-of-the-art classification result with a single type of low-level descriptor (which used a more involved coding method as well as significant post-processing) is just 59.2% mAP. Therefore, it is evident that learning to properly localize the object in the image holds great promise for improving classification accuracy.

A task to be performed is deriving accurate enough location information to help classification. Obviously, if the location information is not reliable enough, it can easily end up hurting classification performance. Reliable localization becomes very challenging on a generic dataset like PASCAL07 classification dataset where objects vary greatly in appearance and viewpoint, are often occluded, and appear in highly cluttered and unstructured scenes. In fact, most prior art work on weakly supervised localization use simpler data sets. While one prior art approach actually attempted to address the PASCAL07 classification dataset, to simplify the problem however, they trained object class models separately for different viewpoints of objects. We are interested in learning generic object detectors without any additional annotations and evaluating classification performance on the original 20 object classes.

To this end, we introduce a novel framework of object-centric spatial pooling (OCP) for image classification. OCP can be considered to at least include the following two steps: (1) inferring the location of the objects of interested; and (2) pooling low-level features from the foreground and the background separately to form the image-level representation. In order to infer the object locations, we propose an iterative procedure for learning object detectors from only image class labels (or weak labels). Very different from existing methods for learning weakly supervised object detectors, the present principles directly optimize the classification objective function and use object detection as an intermediate step. This is described in further detail hereinafter. Significantly, OCP enables feature sharing between classification and detection: the resulting feature representation of OCP can be seen as both a bounding box representation (or detection) and an image representation (for classification). This is also described in further detail hereinafter. As we show in subsequently show herein, such feature sharing plays an essential role in improving classification performance.

We will now further describe classification formulation, in accordance with the present principles.

We assume we are dealing with the binary image classification problem since multi-class classification is often solved in practice by training one-versus-all binary classifiers. Given N data pairs, $\{I_i, y_i\}_{i=1}^{N}$, where $I_i$ is the $i^{th}$ image and $y_i \in \{+1,$ −1} is a binary label of the image, the SVM formulation for binary image classification with OCP becomes as follows:

$$\min_{w,b} \frac{1}{2}\|w\|^2 + C\sum_{i}^{N} \xi_i \quad (1)$$

$$\text{s. t. } y_i \max_{B \in BB(i)} [w^T \mathcal{P}_B(I_i) + b] \geq 1 - \xi_i \quad (2)$$

$$\xi_i \geq 0 \; \forall i \quad (3)$$

where w is the SVM weight vector, b is a bias term, $w^T$ is the transpose of w, $P_B(I_i)$ is the image feature representation of image $I_i$ using OCP with given bounding box B, BB(i) is the collection of all bounding box windows within image $I_i$, and $\xi_i$ is slack variable. It is to be appreciated that BB(i) can be obtained by either densely sampling sliding windows or by using salient regions. We do not require any ground truth localization information in this optimization.

Interestingly, the above formulation can also be viewed as multi-instance learning (MIL) for object detection. However, the traditional MIL formation only uses the foreground for constructing the bounding box features and discards the background information. This has its drawbacks in both detection and classification. As a result, the traditional MIL formation used for object detection was not able to accurately localize objects even on simpler datasets such as Caltech101. Rather, the traditional MIL formation used for object detection tended to choose regions which were larger than the object of interest to encompass contextual information for classification. We fix these drawbacks by using a foreground-background representation, as described below. As a result, we are able to localize objects on the significantly more challenging PASCAL07 classification dataset with accuracy comparable to state-of-the-art weakly supervised object localization methods.

We will now further describe foreground-background feature representation, in accordance with the present principles.

In the classification formulation in Equation 3, the foreground-background feature representation of OCP provides a natural mechanism for feature sharing between classification and detection. In fact, even for standalone detection and classification, the foreground-background feature representation is advantageous compared to traditional foreground-only feature representation.

We will now further describe foreground-background feature representation for classification, in accordance with the present principles.

The foreground-background feature representation provides stronger classification performance than its foreground-only counterpart. This is not surprising since the background provides strong scene context for classification. For example, for the class boat, the surrounding water in the image may provide a strong clue that this image includes a boat. Similarly, seeing a road at the bottom of an image can strongly indicate that this image is likely about cars. Referring back to the classifiers trained on tight bounding boxes as described above, if we replace the foreground-only feature representation with the foreground-background representation, we further improve the classification mAP from 69.7% to 71.1%. This highlights the fact that the foreground-background feature representation carries important information for classification which may be missing in the foreground-only representation.

We will now further describe foreground-background feature representation for detection, in accordance with the present principles.

Figure 7:
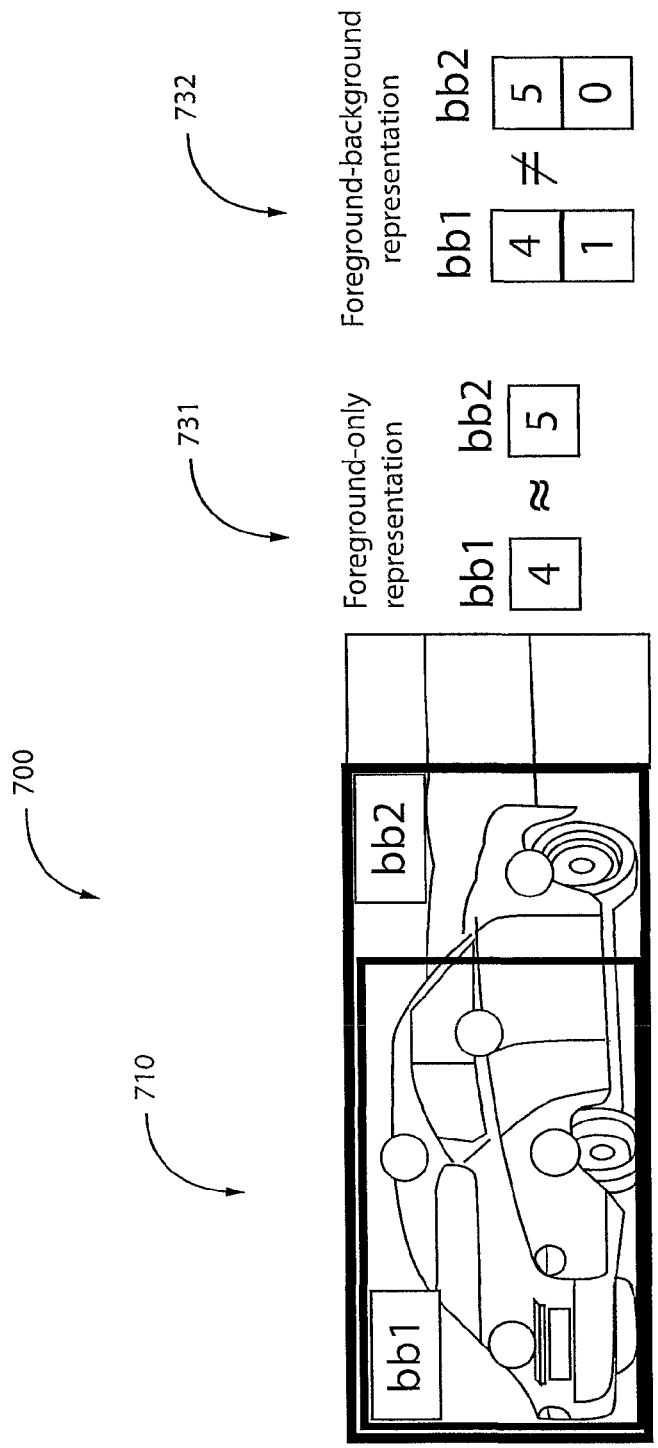
FIG. 7 is a diagram showing an example 700 of jointly learned foreground and background features, in accordance with an embodiment of the present principles.

Object detectors trained with the foreground-background features also tend to yield more accurate bounding boxes during detection. Since the foreground and background models are learned jointly, they will prevent the object appearance features from leaking into the background, and context features from leaking into the foreground. This is illustrated in FIG. 7, which shows an example 700 of jointly learned foreground and background features for an image 710, in accordance with an embodiment of the present principles. In FIG. 7, bounding boxes $bb_1$ and $bb_2$ have a similar foreground-only feature representation 731, but they are very different under the foreground-background representation 732. Here, the numbers denote the count of object-related descriptors. For $bb_1$, parts of the object that leaked into the background will be greatly discounted by the background model.

To validate the effectiveness of the foreground-background feature representation for detection, we also experimented on the PASCAL07 classification dataset, training fully supervised object detectors using the foreground-only and the foreground-background feature representation respectively. It was no surprise that the foreground-background feature representation yielded significantly better detection performance. Here we skip the details of the experiments for the sake of simplicity since supervised detection is not the major focus of the present principles.

With the foreground-background representation of OCP, optimizing the formulation in Equation 3 can be seen as a simultaneous detection and classification procedure. This is because the foreground-background representation can be seen as both a bounding box representation (for detection) and an image-level representation (for classification).

We will now describe the optimization of the formulation of the foreground-background feature representation, in accordance with the present principles.

Figure 8:
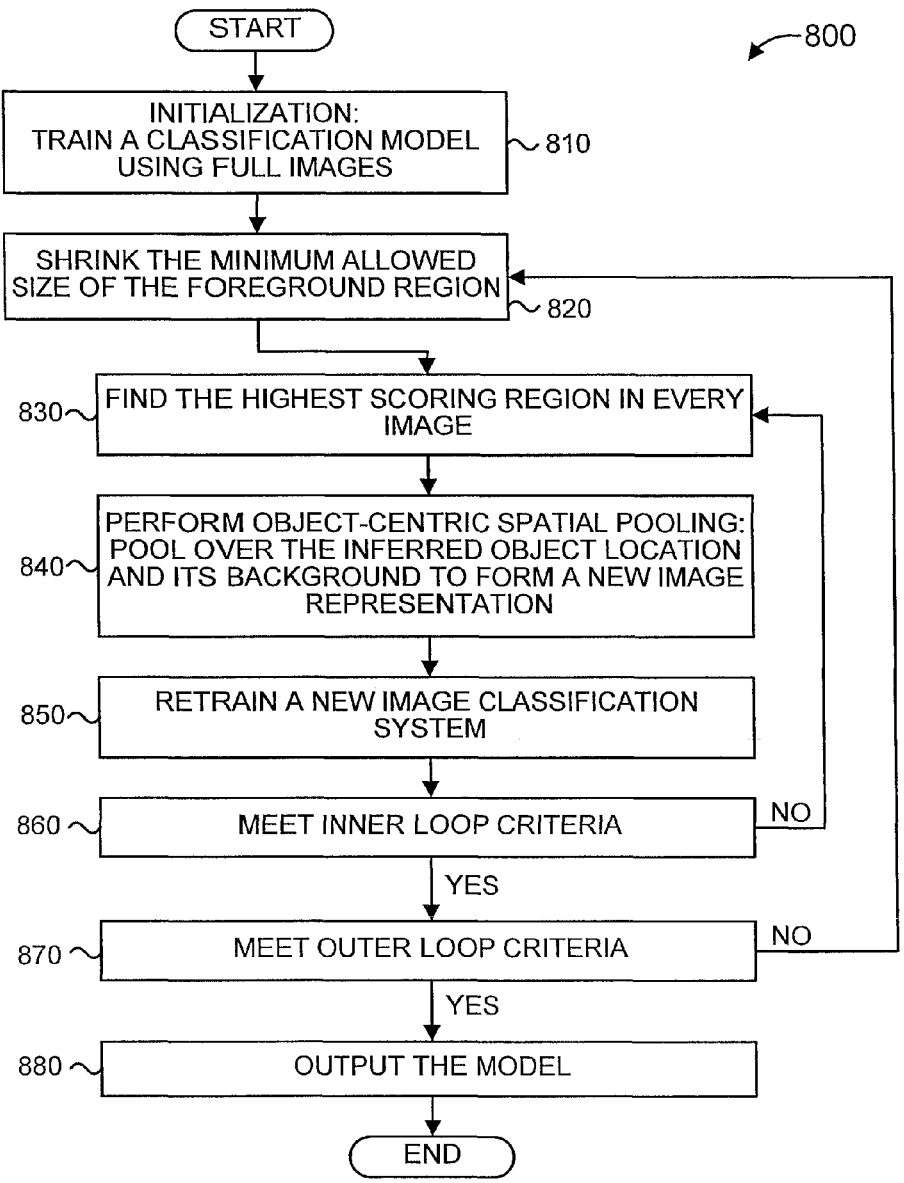
FIG. 8 is a flow diagram showing an exemplary method 800 for an object-centric spatial pooling (OCP) training procedure, in accordance with an embodiment of the present principles.

FIG. 8 is a flow diagram showing an exemplary method 800 for an object-centric spatial pooling (OCP) training procedure, in accordance with an embodiment of the present principles. It is to be appreciated that some steps or portions of steps in method 800 are similar to method 400. However, it is to be further appreciated that method 800 goes beyond method 400 in involving inner and outer loops as described in further detail herein below. The use of these loops and their advantages to OCP will be readily apparent to one of ordinary skill in the art, given the teachings of the present principles provided herein. Lastly, it is to be appreciated that portions of any of the embodiments described herein may be combined and/or otherwise modified to provide the maximum benefit relating to OCP, as readily apparent to one of ordinary skill in the art.

At step 810, an initialization step is performed involving training a classification model using full images. At step 820, the foreground region is shrunk to the minimum allowed size. In an embodiment, the minimum allowed size can be determined based on certain criteria including, but not limited to, a predetermined size, a predetermined size range, the image resolution, and so forth. Thus, for example, in an embodiment, the criteria relating to the use of bounding boxes as described herein can be used with respect to step 820. Moreover, in an embodiment, the minimum allowed size can be 0 or can be inferred based on the image resolution to be the minimum object size one would expect to see in the image (e.g., 10×10 pixels, with the preceding merely an illustrative number for the sake of illustration). At step 830, the highest scoring region is found in every image. Further regarding step 830, it is to be appreciated that in an embodiment, a subset of all of the full images mentioned with respect to step 810 can be used, depending on the implementation and criteria set forth for the implementation. At step 840, object-centric pooling is performed which, as is described fully herein, involves pooling over the inferred object location and its background to form a new image representation. It is to be appreciated that step 840 can involve the use of the inner and outer loops as described in detail hereinafter. At step 850, a new image classification system is re-trained. At step 860, it is determined whether or not inner loop criteria have been met. If so, the method 800 proceeds to step 870. Otherwise, the method 800 returns to step 830. At step 870, it is determined whether or not outer loop criteria have been met. If so, the method 800 proceeds to step 880. Otherwise, the method 800 returns to step 820. At step 880, the resultant model is output.

Thus, now that we have defined our objective and our foreground-background feature representation, we discuss how to optimize this formulation. FIG. 8 represents an embodiment directed to this optimization. The optimization in Equation 1 is non-convex because of the maximization operation in the constraints. Thus we need to be careful during optimization to avoid local minima. In particular, since we are not given any localization information during training, our optimization algorithm includes an outer loop that bootstraps the background region from the foreground and an inner loop that trains the appearance model.

We will now describe the outer loop for bootstrapping background regions, in accordance with the present principles.

In a purely classification setting, no foreground and background annotations are provided initially. We initialize the background region by cropping out a 16-pixel border of each image. Then the outer loop bootstraps the background by gradually shrinking the smallest bounding box considered in the bounding box search (BB(i) in Equation 1). Thus we begin localizing using large windows and iteratively allow smaller and smaller windows as we learn more and more accurate models. As the background region is allowed to grow, the algorithm learns more and more accurate background models. If the algorithm goes too aggressively, it will end up in bad local minima. For example, if the localization is so inaccurate that many features from the object of interest appear in the background region, the model would learn that objects features actually belong to the background. This would lead to bad classification models which are hard to correct in later iterations. However, as long as such bad local minima are avoided, the specific rate of shrinking the foreground region does not affect performance in our experiments.

We will now describe the inner loop for learning the appearance model for detection, in accordance with the present principles.

Given the current constraint on the background size, we need to learn the best object appearance model. This is done in the following two steps: (1) detection, where given the current appearance model we find the best possible object location from positive images (images that are known to include the object of interest); and (2) classification, where given the proposed bounding boxes from positive images as positive examples and a large sample of bounding boxes from negative images as negative examples, we construct the bounding box representation using OCP and then train a binary SVM classifier for discriminating the positive bounding boxes from the negative bounding boxes. In contrast to more common treatments which would need another loop to bootstrap the difficult negative bounding boxes and iteratively improve the SVM model, here we get rid of this extra loop of the more common treatments by solving an SVM optimization directly with all (can be up to and often millions of) negative bounding boxes. Of course, all numbers provided herein are for the sake of illustration, and other numbers of bounding boxes and all other items (including, but not limited to, input images, number of classifiers, number of features and so forth) specified herein can be used in accordance with the teachings of the present principles. The same applies to the specific types of items referred to herein, such as feature types and so forth, as readily understood by one of ordinary skill in the art.

We make use of candidate image regions proposed in an unsupervised fashion to avoid both sampling too many negative windows for classification and running a sliding windows search for detection. Since the candidate bounding boxes aim to achieve a high recall rate (>96%), we ended up with 1000 to 3000 candidate bounding boxes per image. For the PASCAL07 classification dataset, we have 5011 images in the training and validation sets. Therefore, for each inner loop, we need to solve for 20 binary SVMs with about 10 million data examples. Furthermore, our feature representation for OCP is very high-dimensional. For example, we used a codebook of 8192 for LLC coding, pool the low-level features on the foreground region using 1×1 and 3×3 SPM pooling regions, and separately pool all low-level features in the background, thus resulting in a feature vector of dimension 8192× 11=90112. Indeed, if we save all the feature vectors from the 5011 images, this would require more than 700 G of space. Most off-the-shelf SVM solvers would not be able to handle such a large-scale problem. So, we developed a stochastic gradient descent algorithm with averaging. We were able to run an inner loop in 7 to 8 hours and finish the training (inner look and outer loop) in about 3 days on a single machine.

We will now describe some experiments pertaining to OCP, in accordance with the present principles.

We validate our approach on the challenging PASCAL07 classification dataset, including 5011 images for training and validation, and 4952 images for testing. This dataset includes 20 object categories, with object instances occurring in a variety of scales, locations amid viewpoints.

We will now describe the image representation for the experiments pertaining to OCP, in accordance with the present principles.

For low-level features, we extract DHOG features with patch sizes of 16×16, 25×25, 31×31 and 46×46. We then run Linear Locality-Constrained (LLC) coding using a codebook of size 8192 and 5 nearest neighbors. For the baseline representation, we pool the DHOG features using 1×1 and 3×3 SPM pooling regions over the full image. Thus each image is represented using a feature vector of dimension 8192×10=81920. For our object-centric pooling, we use the same SPM representation but on the foreground region and also pool over all low-level features in the background separately, thus giving us a feature dimension of 8192×11=90112.

We will now describe joint classification and localization for the experiments pertaining to OCP, in accordance with the present principles.

Figure 9:
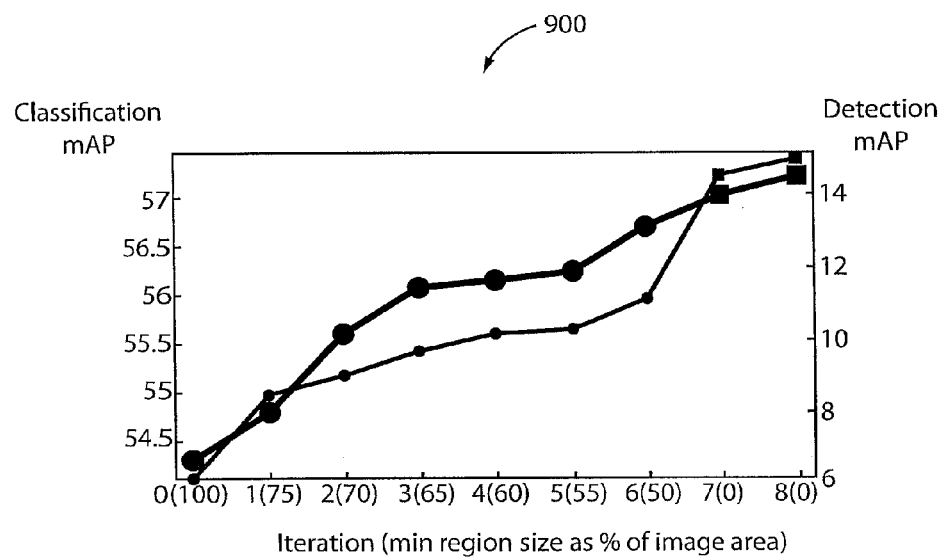
FIG. 9 shows a plot 900 of classification and detection mAP on the PASCAL07 classification dataset over the iterations of our joint detection and classification approach, in accordance with an embodiment of the present principles.

A significant insight behind our approach is that object classification and detection can be mutually beneficial. In particular, as the classification accuracy improves we expect detection accuracy to improve as well, and vice versa. We begin by verifying that this is indeed the case. FIG. 9 shows a plot 900 of classification and detection mAP on the PASCAL07 classification dataset over the iterations of our joint detection and classification approach, in accordance with an embodiment of the present principles. The solid line is classification mAP, and the dotted line is detection mAP. The plot 900 shows the steady improvement in mean average precision on both classification and detection over the iterations (outer loop) of our algorithms. We see a steady joint improvement of classification and detection accuracy.

As a baseline (iteration 0), we use a classifier trained on full images with the SPM spatial pooling representation, which is equivalent to assuming an empty background region in the foreground-background representation. Interestingly, even after just one iteration, our classification mAP is already 54.8%, which is 0.5% greater than the 54.3% SPM classification result. However, we make use of only one type of low-level image descriptor in contrast to the SPM classification result and, further in contrast to the SPM classification result we do not perform any additional post-processing of the features. The work of the SPM classification result provides 59.3% classification mAP on this dataset when using LLC coding, but this relied on significant post-processing of the resulting image features. To simplify the comparison, we do not involve the post-processing.

In the end, our OCP method achieves a 57.2% classification mAP, significantly outperforming the SPM representation. In fact, it significantly outperforms even a much richer 4-level SPM representation of size 8192×30 which achieves only 54.8% classification mAP. On the detection side, our approach was able to improve the baseline of 6.10% detection mAP to the final 15.0%.

It is important to note that jointly optimizing detection and classification using OCP as in Equation 3 plays an essential role in achieving the joint improvements for classification and detection. When detection amid classification are optimized separately higher detection accuracy may not always means higher classification accuracy.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for classifying an image, comprising:
inferring location information of an object of interest in an input representation of the image;
determining foreground object features and background object features from the input representation of the image;
pooling the foreground object features separately from the background object features using the location information to form a new representation of the image, the new representation being different than the input representation of the image;
classifying the image based on the new representation of the image;
performing an outer iterative loop, the outer iterative loop comprising:
initializing a background region from the input representation of the image; and
incrementally shrinking at least a smallest bounding box from among a plurality of varying sized bounding boxes applied to the background region to incrementally increase a size of the background region with respect to at least the smallest bounding box;
performing an inner iterative loop that cooperates with the outer iterative loop, the inner iterative loop comprising:
inferring the location information of the object of interest from a current version of the smallest bounding box; and
from among a set of positive bounding boxes from positive images that are known to include the object of interest therein and from among a set of negative bounding boxes from negative images that are known to omit the object of interest therein, training a support vector machine classifier to discriminate the positive bounding boxes from the negative bounding boxes to refine the location information of the object of interest,
wherein said classifying step classifies the image based on discrimination results applied to a binary label of the image.

2. The method of claim 1, further comprising separating the foreground object features from the background object features using only image-level class labels.

3. The method of claim 2, wherein the image-level class levels are inferred using one or more bounding boxes.

4. The method of claim 2, further comprising training an object classification model using the foreground object features, the background object features, and the image-level class labels.

5. The method of claim 1, wherein said pooling and classifying steps combine the location information with classifying information in a joint model for both localization and classification.

6. The method of claim 1, wherein at least the smallest bounding box is incrementally shrunk until a predetermined condition is reached.

7. The method of claim 6, wherein the predetermined condition comprises at least the smallest bounding box entirely encompassing the object of interest including salient and non-salient portions thereof.

8. The method of claim 1, wherein at least the smallest bounding box is positioned around a most prominent instance of an object class within the background region, the most prominent instant of the object class being equated to the object of interest.

9. The method of claim 1, wherein the support vector machine classifier uses only features in the set of positive bounding boxes to the exclusion of features from an entirety of the image that are outside the positive bounding boxes.

10. The method of claim 1, further comprising retraining an object classification model initially used to separate the foreground object features from the background object features based on the new representation of the image.

11. The method of claim 10, further comprising updating a hypothesis of the location information of the object using the retrained object classification model, and repeating said determining and pooling steps to form another new representation of the Image.

* * * * *